Patented Nov. 9, 1943

2,333,701

UNITED STATES PATENT OFFICE 2,333,701

ACID

Frank O. Cockerille, Albemarle, Va., assignor to E. I. du Pont de Nemours & Company, Wilmington, Del., a corporation of Delaware No Drawing. Application November 16, 1940,
Serial No. 365,947

10 Claims. (Cl. 260—513)

This invention relates to the manufacture of methane trisulfonic acid and catalytic sulfonic acid mixtures containing the same.

A new catalytic material, methane trisulfonic acid, for the reaction between acetylene and carboxylic acids has recently been discovered. This reaction (or combination), which proceeds slowly, if at all, in the absence of a catalyst, results in the formation of vinyl esters and ethylidene esters. In equation form the interaction may be represented simply as the addition of one or two mols of the carboxylic acid to one mol of acetylene.

Using acetic acid for illustrative purposes the course of the reaction is conveniently shown as a two-step process by the following equations:

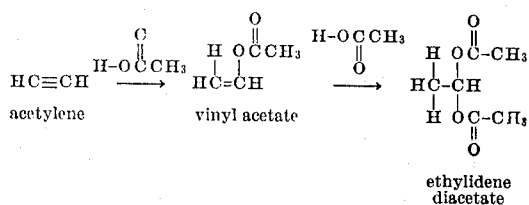

Both these reactions occur simultaneously to a greater or lesser extent depending generally upon the conditions, particularly temperature.

A process for manufacturing methane trisulfonic acid which gives as a reaction product a mixture of sulfonic acids (including the methane trisulfonic acid) which without purification or other treatment is especially effective for catalyzing reactions of this type is known. This mixture comprises essentially methane trisulfonic acid about 15%, sulfoacetic acid about 62%, and other sulfonic acids, principally methane disulfonic acid, about 23%. In this process a suitable synergic or auxiliary mercury salt catalyst (such as those well known in the art) is always present with the methane trisulfonic acid or its admixtures.

This invention had for an object the provision of a new and improved method of preparing methanetrisulfonic acid. Further objects were the preparation of a more powerful catalyst for promoting the absorption interaction of acetylene and liquid aliphatic carboxylic acids to form vinyl and/or ethylidene esters. Still other objects were to devise methods for preparing sulfonic acid mixtures containing large proportions of methane trisulfonic acid, to form vinyl and ethylidene acetates with smaller amounts of catalyst compositions than were heretofore possible, to catalyze the formation of vinyl acetate and ethylidene acetate by use of a mercury salt and a crude methane trisulfonic acid manufacturing process reaction product containing a high proportion (at least 50%) of methane trisulfonic acid, to catalyze the formation of vinyl acetate and ethylidene diacetate by use of a mercury salt and a sulfonic acid mixture consisting principally of methane trisulfonic acid and to prepare a catalyst for the formation of esters from acetylene and liquid carboxylic acids from mercury compounds and sulfonic acid mixtures containing large proportions of methane trisulfonic acid and only traces of methionic acid. A general advance in the art and other objects which will appear hereinafter are also contemplated.

It has now been found that by slowly adding one part of acetic acid (or acetic anhydride) to four to seven parts of oleum under controlled temperature conditions, a mixture of sulfonic acids of which 50% or more is methane trisulfonic acid can be produced. A somewhat higher yield (for each set of conditions) is obtained if acetic anhydride is used, so that this material is preferred when crystalline methane trisulfonic acid is to be prepared.

In preparing catalytic mixtures glacial acetic acid is preferably used because it gives acetic acid-soluble mixtures of sulfoacids from which by-products do not precipitate upon standing. Such mixtures are six to eight times as effective in catalysis as the prior art mixtures. An additional reason for using acetic acid is that it permits better temperature control and consequently more rapid addition to the oleum. This is an important advantage in commercial scale operations because considerably less attention is required from the operator.

The catalytic mixture just mentioned is designed to be used instead of the catalytic mixture described in U. S. A. Patent No. 2,254,212. (Dinwiddie). In the interest of brevity and to avoid encumbering this specification reference is made to that patent for details of the use of the catalytic substance.

From the following description, in which are disclosed certain embodiments of the invention as well as details as to what is believed to be the best mode for carrying out the invention, it will be apparent how the foregoing objects and related ends are accomplished. The quantities are given in parts by weight throughout the application unless otherwise specified.

Example I

To 1070 parts of 65% oleum there was added slowly (about 2 parts per minute) 200 parts of glacial acetic acid with constant agitation. The mixing was carried out in a vessel having an enameled lining and efficient agitating means. The addition was so regulated that the initial temperature of 30° C. ±10° had increased gradually to 70° or 75° C. by the time 120 parts of acid had been added. The last 80 parts of the acetic acid were added also slowly while continuing the agitation and maintaining the temperature within the range of 80° C. to 85° C. When the acetic acid was all in, the temperature was raised gradually to about 95° C.

At this stage spontaneous evolution of heat occurred, and foaming (which takes place at all temperatures above 70° C.) became more vigorous than before. Artificial cooling was employed to moderate the intensity of the reaction. As the interior heat evolution slowed down, exterior heating sufficient to maintain an internal temperature of 95° C. ±3° C. was applied. Heating at about 95° C. and agitation were continued for 15 hours. At this time the reaction mass was diluted with 3600 parts glacial acetic acid, of which the first 400 parts were added slowly while cooling the vessel externally and continuing the agitation in order to prevent local overheating. A clear solution cherry-red in color resulted. No crystals separated even after weeks of standing. The solution was found to contain about 13% of methane trisulfonic acid (calculated as anhydrous), about 5% of sulfuric acid, and about 5% of sulfoacetic acid. There were traces of methionic (methane disulfonic acid) and other sulfonic acids, the remainder being acetic acid which was employed as the solvent. In this case the yield of the methane trisulfonic acid was about 76% of theory based on the amount of acetic acid used prior to the beginning of the dilution.

The clear solution in acetic acid (together with mercury sulfate) was used as the absorption catalyst in the manufacture of vinyl acetate and ethylidene diacetate. Its activity was such that only about one-half as much was required for the absorption as of the catalyst mixture prepared under the conditions outlined in Example II of the Dinwiddie patent. This is believed to be due to the presence of about three times as much methane trisulfonic acid in the sulfonic acid solution.

Example II

To 1070 parts of 65% oleum in an enameled vessel there was added very slowly, while stirring, 175 parts of 95% to 98% acetic anhydride. The anhydride addition was regulated so that the initial temperature of 25° C. had increased gradually to about 75° C. when 105 parts had been added. The last 70 parts were added at a temperature of 80° to 85° C. When the anhydride was all in, the temperature was raised gradually to 95° C.

During this period the same spontaneous evolution of heat as that described in Example I occurred and artificial cooling was needed to moderate the intensity of the reaction. As the internal heat evolution slowed down, exterior heating was applied so that there was sufficient heat to maintain an internal temperature of about 95° C. Heating at 95° C. and agitation were continued for three hours, whereupon the charge was diluted with 400 parts of glacial acetic acid which was added at the rate of about 5 parts per minute while continuing the agitation. When this addition was completed, another 3200 parts of glacial acetic acid were added somewhat more rapidly.

The solution was found to contain about 15% methane trisulfonic acid (calculated as anhydrous), about 6% sulfuric acid, and about 3% of sulfoacetic acid. Traces of methionic and other sulfonic acids were found. The remainder was the acetic acid used as the solvent. The yield of methane trisulfonic acid in this case was about 83% theoretical (based on the amount of the acetic anhydride used). After thorough mixing the solution is ready for use as the absorption catalyst in the manufacture of vinyl acetate and ethylidene diacetate.

Example III

A run corresponding to that of Example II, but instead of diluting the reaction mixture with glacial acetic acid, at the same point the heating at 95° C. was continued for 12 hours, during which time the composition changed from a sirupy liquid to a thick crystalline suspension. By this time gas evolution had almost ceased. External cooling was again applied and water was run in very slowly until all crystals had dissolved, the temperature having been permitted to reach 150° C. Cooling and agitation were continued until the mass had been brought to about 25° C.

Copious crystallization was found to have occurred and the crystals were separated from the mother liquor by centrifuging. These crystals were found to be a hydrated form of methane trisulfonic acid containing about 2% sulfuric acid. By heating them to 150° C. with the addition of the minimum quantity of water required for complete solution, then cooling with efficient stirring and centrifuging away the portion which failed to precipitate, the sulfuric acid content of the resulting crystals was found to be about 0.5%. Additional recrystallization increased the purity still further. Traces of color were readily removed by treating in solution with any of several decolorizing carbons and filtering the hot solution. Mother liquors (except the original which contained only about 1% of the total yield of methane trisulfonic acid with essentially all of the by-products) were back-processed by combining with a succeeding charge. The yield of 98% methane trisulfonic acid was 890 parts, which is about 83% of theory (assuming a composition of the trihydrate).

Example IV

To 1020 parts of 80% oleum 205 parts of glacial acetic acid were added slowly in two portions of 150 and 55 parts. The first (larger) portion was added over a gradually increasing temperature scale so that 75° C. (temperatures in the range 70° to 80° C. are satisfactory) had been attained by the time it was all in. The mixture was held for one hour at 70° C. to 80° C., after which the second portion was added at 80° C. to 90° C. The amount of heat evolved during this addition was but little more than that observed in Example I in which the oleum used was of somewhat lower concentration. The temperature was raised over a period of one hour to 95° C. and held there during an additional period of 18 hours. During this time the material crystallized to the extent of appearing to become almost dry. Except for the final appearance of the product, no appreciable difference was observed in the course of the reaction as compared with Example I. Dilution with water was made as in Example III, followed by crystallization and centrifugation of the hydrated acid. The yield (calculated as trihydrate) of methane trisulfonic acid in this case was 932 parts, or about 88% of theory.

Example V

To 1070 parts of 65% oleum 175 parts of glacial acetic acid were added slowly. A temperature of 85° C. was attained by the time 120 parts had been added. This temperature was maintained one hour before adding the remaining 55 parts of the acid at 83° C. to 85° C. When the acetic acid was all in, the temperature was raised gradually to 95° C. and held there during 6 hours. The reaction product was then diluted with glacial acetic acid as in Example I. Analysis showed the presence of 11.2% of methane trisulfonic acid in the diluted mixture. This corresponds to 69.1% of theory based on the amount of acetic acid used prior to dilution of the reaction mixture.

Example VI

To 1070 parts of 65% oleum at 25° C. in an enameled vessel, 175 parts of 95% to 98% acetic anhydride were added very slowly, while stirring. The acetic anhydride addition was regulated so that the initial temperature (of 25° C.) increased gradually to about 75° C. by the time 105 parts had been added. The last 70 parts were added at a temperature of 80° to 85° C. When the anhydride was all in, the temperature was raised gradually to 95° C.

The same spontaneous evolution of heat as that described in Examples I and II occurred, and artificial cooling was needed to moderate the intensity of the reaction. As the internal heat evolution slowed down, exterior heating was applied so that there was sufficient heat to maintain an internal temperature of about 95° C.

Heating at 95° C. and agitation were continued for twenty hours. At this stage the reaction mass consisted of a thick suspension of crystals in a deeply colored, viscous liquor. The charge was then cooled to within the range 15° to 25° C., preferably about 15° C., after which 250 pounds of cold (10°–15° C.) glacial acetic acid were stirred in very slowly under such efficient cooling that the internal temperature never exceeded 25° C. The amount of acetic acid used for this washing should be within the range 20% to 50% by weight of the crystalline material. The thick, pasty mass so produced was cooled to 15° C. and pumped to a centrifuge for separation of the solid and liquid components.

It was found that the bulk of the lower sulfonation products (mainly sulfoacetic acid) was dissolved and carried into the filtrate by the acetic acid. The filtered solution formed in this manner was used instead of glacial acetic acid in manufacturing a subsequent batch of methane trisulfonic acid.

The centrifuge retained a crystalline composition which was found to correspond to a crude form of a molecular (1:1 molar addition) compound between sulfuric and methane trisulfonic acids. Washing on the centrifuge with small amounts of cold acetic acid served to remove the adhering film of mother liquor, but led to an appreciable loss of the crystalline material. It was found practical to produce crystals free of acetic acid and other volatile substances by heating the centrifuged product in a vacuum to about 100° C.

This crystalline molecular compound which, so far as is now known, is an entirely new composition of matter, has a number of rather unusual properties. It is extremely hygroscopic, and as a dehydrating agent it is rather unique in that the water reacts chemically and irreversibly, forming hydrated sulfuric acid and the trihydrate of methane trisulfonic acid. Even such a powerful dehydrating agent as acetic anhydride is incapable of dehydrating this latter product. Neither the molecular compound nor its products of hydrolysis exhibit any volatility at temperatures below about 200° C. As the molecular compound is subjected to hydrolysis, crystals of trihydrated methane trisulfonic acid separate from a mother liquor of strong sulfuric acid. These crystals may be separated and used chemically with or without purification as described in Example III.

In addition it serves admirably as a source of methane-trisulfonic-acid catalyst for the absorption reaction of acetylene in acetic acid. The molecular compound dissolves unchanged in moderate quantities of hot acetic acid or anhydride, and in hot mixtures of these two, as shown in some of the preceding examples. The solutions may be used advantageously not only as a catalyst in the absorption reaction of acetylene in acetic acid, but also as a catalyst for the reaction of cellulosic materials with acetic anhydride. Where used in the latter capacity, the hygroscopic nature of the molecular compound leads to some economy with respect to anhydride, and averts in large measure certain of the objections to the use of sulfuric acid.

The temperature ranges for the new process of preparing methane trisulfonic acid are relatively narrow. If the temperature is allowed to rise rapidly at first, there is a loss of sulfur trioxide. This impairs the sulfonating powers of the oleum. The acetyl sulfuric acid formed below 70° C. rearranges to sulfoacetic acid with spontaneous evolution of heat at 70° C. to 75° C. (this rearrangement occurs at lower temperatures, but more slowly).

It is best, therefore, to withhold the further addition of acetic acid until the evidence of this rearrangement has begun to subside. The intermediate temperature of 75° C. (specified when about 60% of the total acetic anhydride or glacial acetic acid have been added) is therefore based on these two aforementioned features. Summarizing, there is a loss of sulfur trioxide if the temperature rises too rapidly, and there is too much accumulation of latent energy if the temperature attainment is delayed while adding excessive amounts of acetic acid or anhydride.

By adding the acetyl material in two portions, a convenient safety factor is provided. The relative proportions of the two parts may be varied over rather wide limits without changing the reaction critically. For instance, in the first stage, one part of acetic acid (or anhydride) should be added for about 10 parts of 65% oleum (other strength oleums will require different first stage acetic acid or anhydride ratios), that is, the first portion of acetic acid (or anhydride) added may vary from about 50% to about 75% of the total addition.

Instead of operating with an intermediate temperature of 75° C. (marking the end of the first stage of the reaction), the process may be operated so that the first addition is all in at about 65° C. by adding the acetic acid (or anhydride) over a somewhat longer period of time. On the other hand, by increasing the rate of addition, the temperature will be found to rise somewhat more rapidly, and a temperature of 80° C. may be reached by the time the first portion of acetic acid (or anhydride) is all in.

The second critical temperature is 95° C. If the temperature be allowed to rise more than a few degrees (to over 100° C.) above this figure, an appreciable amount of methionic acid is formed at the expense of an equivalent quantity of methane trisulfonic acid. At a few degrees below (say, 90° C.) the rate of formation of the methane trisulfonic acid is greatly decreased.

The limits on the ratio of acetic acid (or its anhydride) to oleum also are confined to a relatively narrow range. To increase the ratio of the organic reactant greatly beyond the limits specified (4 to 7 parts of oleum for each part of the acetic acid or its anhydride), brings about a significant decrease in the yield of the trisulfonic acid and a corresponding increase in the amount of sulfoacetic acid, which latter may be considered a lower sulfonation product. To decrease the ratio also greatly decreases the yield by the simple expedient of offering an insufficiency of material to be sulfonated.

The limits for acetic acid and acetic anhydride are substantially the same, because the dehydrating power of the anhydride almost exactly atones for its lower equivalent weight in determining its ability to exhaust the sulfonating capacity of a given weight of oleum. Acetic anhydride tends to consume $H_2SO_4$ as well as $SO_3$ from the oleum, whereas acetic acid consumes only $SO_3$. Based on the foregoing information, a higher yield of methane trisufonic acid may naturally be expected by use of the anhydride, but it is to be understood that this is not always the most important consideration.

The use of 75% to 80% oleum instead of the commercially available 65% oleum gives somewhat higher yields of methane-trisulfonic acid, and is especially desirable when acetic acid is used.

With respect to the relative utility of acetic acid and acetic anhydride in the reaction, slightly better yields of methane trisulfonic acid are obtained by the use of the anhydride, and better temperature control and more rapid addition are possible with the use of acetic acid (because of the lower energy release). The dehydrating power of oleum is about 25% greater (on a weight basis) than that of acetic anhydride. In the proportions of reactants set out above, the amount oleum used is more than five times as great. The difference in hydration between acetic acid and acetic anhydride, contrary to what might be expected at first sight, can therefore be overlooked except when the very highest yield of methane trisulfonic acid is desired, as, for example, when the crystalline hydrate is being prepared.

Methane trisulfonic acid holds a unique position in the field between inorganic and organic acids. Its extremely high degree of ionization, coupled with its solubility in polar solvents and relative insolubility in non-polar solvents, would seem to demand that it be considered with the inorganic acids, yet structurally it must be considered organic. It is one of the few acids which will dissolve stainless steel. Unlike inorganic polybasic acids, the three acidic hydrogen atoms are of nearly equal strength. It is unique among strong acids in that it forms complex salts such as those formed by phosphoric, boric, silicic, citric, tartaric, and other weak acids. Methane trisulfonic acid and its metallic salts (for example, the sodium, potassium, ammonium, calcium, mercury and the like) have many interesting applications.

The salts may be used as analytical reagents for potassium, aluminum, ammonia, certain other metals, and certain organic bases. In the electro-plating industry and in calcium therapy, the salts are also useful. The salts may be advantageously used as a dye solvent (in discharge printing), as a paint remover, as an ink eradicator, as a minor constituent of fertilizers and in the clarification of sugar syrup.

A good technical grade of methane trisulfonic acid (98% purity) may be produced directly by diluting the reaction mixture with a little water and crystallizing the resultant solution. A more pure product, which is entirely free of sulfate, can be obtained by converting the methane trisulfonic acid to its ammonium salt, recrystallizing several times (by dissolving in water and precipitaitng with acetic acid or methanol), and finally converting back to the free acid by treating with aqua regia. A crystalline product is obtained by evaporating the free acid solution at 150° C. in a stream of air.

Both pure and technical grade methane trisulfonic acid (or its salts) may be used for many purposes other than catalysis in the manufacture of vinyl esters and ethylidene diesters. The acid may be used as an acetylation, saponification, or dehydration catalyst. It may also be used as a Twitchell reagent for the hydrolysis of fats, as a desiccating agent, as a pickling acid for metals, as an intermediate in the isolation of potassium and aluminum from their ores, as an electrolyte in storage batteries, etc. It is useful for etching metals, as engraving, and for promoting certain types of polymerization and condensation reactions. At moderately high temperatures it may be used as a mild oxidizing agent. Its usefulness in fertilizers results from its complex salt-forming tendencies which enable it to solubilize certain elements which are ordinarily accessible to plant life only under certain favorable conditions.

The principal advantage of this invention is in the production of a mixture of sulfonic acids containing a much higher ratio of methane trisulfonic acid (to other sulfonic acids) than has been produced heretofore. The weight ratio of methane trisulfonic to methane disulfonic acid to sulfoacetic acid to sulfuric acid in the reaction product of the present invention is approximately 5:trace:2:2.

In addition, the process of this invention can be carried out with much less attention to produce a more uniform product from day to day.

As many apparently widely different embodiments of this invention may be made without departing from the spirit and scope thereof, it is to be understood that I do not limit myself to the specific embodiments thereof except as defined in the appended patent claims.

I claim:

1. The process which comprises adding material from the group consisting of acetic acid and acetic anhydride to oleum, there being 4 to 7 parts of oleum to each part of the acetyl derivative, the temperature being allowed to rise gradually to 65°–85° C. during the addition of 50%–75%, and not above 90° C. during the addition of the remainder of the acetyl derivative, and completing the reaction by holding the mixture in the temperature range 90°–100° C.

2. The process which comprises adding material from the group consisting of acetic acid and acetic anhydride to oleum, there being 4 to 7 parts of oleum to each part of the acetyl derivative, the temperature being allowed to rise gradually to 75° C. during the addition of 60%, and not above 90° C. during the addition of the remainder of the acetyl derivative, and completing the reaction by holding the mixture in the temperature range 90°–100° C.

3. The process which comprises adding material from the group consisting of acetic acid and acetic anhydride to oleum, there being 4 to 7 parts of oleum to each part of the acetyl derivative, the temperature being allowed to rise gradually to 75° C. during the addition of 60%, and not above 90° C. during the addition of the remainder of the acetyl derivative, and completing the reaction by holding the mixture in the temperature range 95° C. ±3°.

4. The process which comprises adding material from the group consisting of acetic acid and acetic anhydride to oleum, there being 4 to 7 parts of oleum to each part of the acetyl derivative, the temperature being allowed to rise gradually to 65°–85° C. during the addition of 50%–75%, and not above 90° C. during the addition of the remainder of the acetyl derivative, and continuing the reaction for from 3 to 15 hours at 90°–100° C.

5. The process which comprises adding material from the group consisting of acetic acid and acetic anhydride to oleum, there being 4 to 7 parts of oleum to each part of the acetyl derivative, the temperature being allowed to rise gradually to 75° during the addition of 60%, and not above 90° C. during the addition of the remainder of the acetyl derivative, and continuing the reaction for from 3 to 15 hours at 90°–100° C.

6. The process which comprises adding material from the group consisting of acetic acid and acetic anhydride to oleum, there being 4 to 7 parts of oleum to each part of the acetyl derivative, the temperature being allowed to rise gradually to 75° C. during the addition of 60%, and not above 90° C. during the addition of the remainder of the acetyl derivative, and continuing the reaction for from 3 to 15 hours at 95° C. ±3°.

7. The process which comprises adding material from the group consisting of acetic acid and acetic anhydride to oleum, there being 4 to 7 parts of oleum to each part of the acetyl derivative, the temperature being allowed to rise gradually to 75° C. during the addition of 60%, and in the range 80°–85° C. during the addition of the remainder of the acetyl derivative, and completing the reaction by holding the mixture in the temperature range 95° C. ±3°.

8. The process which comprises adding material from the group consisting of acetic acid and acetic anhydride to oleum, there being 4 to 7 parts of oleum to each part of the acetyl derivative, the temperature being allowed to rise gradually to 75° C. during the addition of 60% and in the range 80°–85° C. during the addition of the remainder of the acetyl derivative, and continuing the reaction for from 3 to 15 hours at 95° C. ±3°.

9. The process which comprises adding material from the group consisting of acetic acid and acetic anhydride to oleum, there being 1070 parts of oleum for each 200 parts of the acetyl derivative, the temperature being allowed to rise gradually to 75° C. during the addition of 60%, and in the range 80°–85° C. during the addition of the remainder of the acetyl derivative, and completing the reaction by holding the mixture in the temperature range 95° C. ±3°.

10. The process which comprises adding material from the group consisting of acetic acid and acetic anhydride to oleum, there being 4 to 7 parts of oleum to each part of the acteyl derivative, the temperature being allowed to rise gradually to 65°–85° C. during the addition of 50%–75%, and not above 90° C. during the addition of the remainder of the acetyl derivative, completing the reaction by holding the mixture in the temperature range 90°–100° C. until a thick crystalline suspension forms, slowly adding water to said suspension until the crystals are dissolved and during the addition of water allowing the temperature to rise to 150° C., thereafter cooling the solution to about 25° C. whereby to crystallize hydrated methane tri-sulfonic acid.

FRANK O. COCKERILLE.

CERTIFICATE OF CORRECTION.

Patent No. 2,333,701. November 9, 1943.

FRANK O. COCKERILLE.

It is hereby certified that error appears in the above numbered patent requiring correction as follows: In the grant, line 1, and in the heading to the printed specification, line 3, residence of the inventor, for "Albemarle" read --Albemarle County--; page 3, first column, line 10, for "850° C." read --85° C.--; page 5, first column, line 34, for "75°" read --75° C.--; and second column, line 33, for "acteyl" read --acetyl--; and that the said Letters Patent should be read with this correction therein that the same may conform to the record of the case in the Patent Office.

Signed and sealed this 11th day of January, A. D. 1944.

(Seal)

Henry Van Arsdale,
Acting Commissioner of Patents.